United States Patent [19]

Nishimura

[11] Patent Number: 4,574,190

[45] Date of Patent: Mar. 4, 1986

[54] VERIFYING SYSTEM

[75] Inventor: Hiroyuki Nishimura, Kameoka, Japan

[73] Assignee: Omron Tateisi Electronics Co., Kyoto, Japan

[21] Appl. No.: 675,269

[22] Filed: Nov. 29, 1984

Related U.S. Application Data

[63] Continuation of Ser. No. 450,736, Dec. 17, 1982, abandoned.

[30] Foreign Application Priority Data

Dec. 21, 1981 [JP] Japan ............................... 56-205082
Jan. 8, 1982 [JP] Japan ............................... 57-1439[U]

[51] Int. Cl.[4] ............................................... G06K 7/08

[52] U.S. Cl. .................................... 235/449; 235/436; 235/454

[58] Field of Search ........................ 235/436, 449, 454

[56] References Cited

U.S. PATENT DOCUMENTS 4,029,944 6/1977 Trenkamp .......................... 235/449
4,315,246 2/1982 Milford .............................. 235/449
4,356,473 10/1982 Freudenthal ........................ 235/436
4,396,602 8/1983 Warthan ............................ 235/449

*Primary Examiner*—Harold I. Pitts
*Attorney, Agent, or Firm*—Wegner & Bretschneider

[57] ABSTRACT

A system for the verification of a magnetically printed material as to whether it is genuine or counterfeit is disclosed having magnetic and photo sensors arranged on the same scan line relative to the magnetically printed material for reading magnetic and optical patterns on the same scan line, and a first discriminator for, after the magnetic and optical patterns are superimposed one above the other at the same check point, discriminating change in level thereof. The system may further comprises a second discriminator for discriminating a change in level of the magnetic pattern. A combined optical and magnetic sensor assembly for the system is also disclosed.

2 Claims, 22 Drawing Figures

VERIFYING SYSTEM

This application is a continuation of U.S. application Ser. No. 450,736 filed Dec. 17, 1982 now abandoned.

The present invention relates to a verifying system for verifying magnetically printed material such as paper money, checks or the like and, more particularly, to a verifying system for use in a money exhanger, an automated vending machine or an automated cash depositing machine for verifying paper money as to whether it is genuine or counterfeit, or for verifying a check, printed with a magnetic ink, as to whether it is genuine or counterfeit.

The present invention also relates to a combined optical and magnetic sensor assembly for use in the verifying system of the type referred to above for scanning the printed materials one at a time.

According to the prior art, the verification of, for example, paper money as to whether it is genuine or counterfeit is carried out by causing separate photo and magnetic sensors, positioned along the path of movement or transportation of the paper money, to scan the paper money to read out patterns on a predetermined track on the paper money, comparing the data of these patterns read out from the paper money with the data of reference patterns, and determining whether the paper money is genuine or counterfeit depending on whether these data patterns coincide with each other or not.

Specifically, the prior art verifying system operates according to a method which comprises reading, by the use of the separate magnetic and photo sensors, both a magnetic pattern (the intensity of magnetism) and an optical pattern (optical concentration resulting from the difference in color and/or the presence of light and dark areas) from one or more scan lines on the paper money, converting both of the magnetic and optical patterns into a bit pattern of "0" and "1" after outputs from the respective sensors have been compared with threshold levels, and comparing bit by bit the magnetic and optical patterns, read out from the paper money, with the reference magnetic and optical patterns stored in a memory to determine whether or not they coincide respectively with the reference patterns. According to this prior art system, even if bits forming the pattern do not coincide with each other and if, for example, 90% of the total bits coincide with each other, the pattern tends to be determined as coinciding with the reference pattern. In this way, by determining whether or not the magnetic and optical patterns coincide with the reference patterns, the paper money is verified as genuine when both of the magnetic and optical patterns are determined as genuine.

However, in the prior art verifying system wherein the determination of "0" or "1" of the pattern is carried out separately to the magnetic pattern and to the optical pattern, the system would not work very well with counterfeit paper money that is made by making a color reproduction with the use of a color copying machine accompanying a precise magnetic printing. More specifically, where the magnetic concentration of the forged paper money made by making a color reproduction of the genuine paper money is of a value generally around the threshold level, the forged paper money tends to be erroneously verified as genuine.

This is particularly true, and so is enhanced, where the verification as genuine takes place when coincidence takes place at a predetermined certainty (for example, when 90%, or more than 90%, of bits coincide with each other).

Accordingly, the present invention has been developed with a view to substantially eliminating these disadvantages and inconveniences inherent in the prior art verifying system and has as its essential object an improved verifying system which works satisfactorily with any magnetically printed material such paper money or checks particularly counterfeit paper money which is a colored reproduction of genuine paper money.

In an attempt to accomplish the above described object of the present invention, the inventors have found that, while the genuine printed material such as genuine paper money has both an area where the intensity of magnetism increases with increase of the color concentration and an area where, even though the color concentration is high, the intensity of magnetism is low, the counterfeit printed material, especially, a color reproduction of the genuine paper money, does not exhibit a detectable magnetism or has the intensity of magnetism proportional to the color concentration, and that the genuine printed material, therefore, has no particular relationship such as exhibited by the counterfeit printed material between the color concentration and the intensity of magnetism.

According to the present invention, magnetic and optical patterns on the same scan line are read out by magnetic and photo sensors and are then superimposed one above the other at the same check point. By discriminating change in level thereof, the verification as to whether the printed material, such as a paper money, is genuine or counterfeit can be achieved.

By so doing, since in the case of counterfeit paper money which is magnetically printed in a multiple of colors by the use of a color copying machine, the magnetic concentration varies in proportion to the optical concentration, change in level of the magnetic and optical patterns are counterbalanced with each other when both are superimposed one above the other, and, by discriminating through the use of a first discriminating means, the fact that such change in level is slight, the paper money so presented for the verification can be verified as counterfeit. On the other hand, since with genuine paper money there is an area where the intensity of magnetism is low even though the optical concentration is high, there is a region where change in level between the magnetic and optical patterns will not be counterbalanced with each other when both are superimposed one above the other and, by discriminating with the first discriminating means the fact that a relatively large change in level is outputed, the paper money so presented for the verification can be verified as genuine.

In addition, by combining the result of discrimination done by the first discriminating means with that done by a second discriminating means for discriminating change in level of the magnetic pattern, counterfeit paper money prepared by the use of a color copying machine which does not work on the basis of a magnetic printing technique can also be verified as such.

It is a related object of the present invention to provide a combined optical and magnetic sensor assembly for use in the verifying system of the present invention.

According to the present invention, the combined optical and magnetic sensor assembly comprises a magnetic sensor and a photo sensor, both built in a single casing. Because the magnetic and photo sensors are combined together in the casing, not only can the space for installation thereof in the verifying system be minimized, but also it serves as an excellent addition to the verifying system for the achievement of precise and accurate verification.

These and other objects and features of the present invention will become clear from the following description taken in conjunction with a preferred embodiment thereof with reference to the accompanying drawings, in which.

Figure 1:
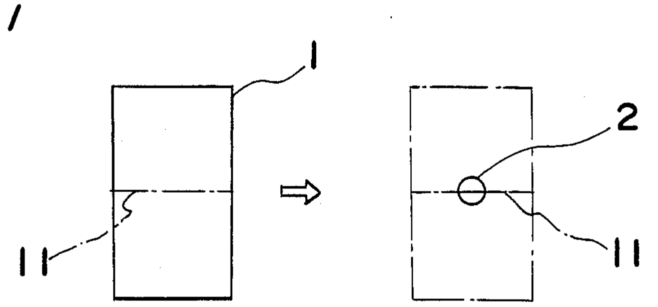
FIG. 1 is a schematic diagram showing how and where verification is performed to on paper money.

Before the description of the present invention proceeds, it is to be noted that like parts are designated by like reference numerals throughout the accompanying drawings. It is also to be noted that, although the present invention is applicable to the verification of any one of checks, paper money, credit cards, and other sheet-like printed material, it will be described as applied to the verification of paper money by way of example for facilitating better understanding of the present invention.

Referring first to FIG. 1, the verification of paper money as to whether the paper money 1 is genuine or counterfeit is carried out by moving the paper money 1 at a constant speed along a predetermined path towards a suitable check point where a combined optical and magnetic sensor assembly 2 is located. At the check point, the sensor assembly 2 reads simultaneously both optical and magnetic patterns on a predetermined track (scan line) 11 formed on the paper money 1.

Figure 2:
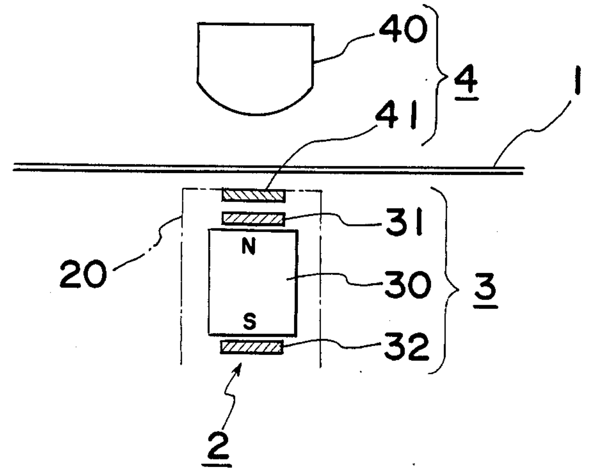
FIG. 2 is a schematic diagram showing a combined optical and magnetic sensor assembly according to the present invention in relation to paper money to be verified.

As schematically shown in FIG. 2, the combined optical and magnetic sensor assembly 2 comprises a casing 20 preferably made of synthetic resin and accommodating therein both a magnetic sensor 3 and a photo sensing element 41. The photo sensing element 41 forming a part of an optical sensor 41 together with a light source 40 may comprise a photo-diode or a photo-transistor and be adapted to receive rays of light which have been projected from the light source 40 and subsequently passed through the track 11 on the paper money 1 positioned between the light source 40 and the photo sensing element 41. So far shown in FIG. 2, the magnetic sensor 3 comprises a permanent magnet 30 and detecting and compensating reluctance elements 31 and 32 respectively positioned adjacent N-pole and S-pole ends of the magnet 30. However, this magnetic sensor 3 may be of a construction comprising a Hall element.

The details of the combined optical and magnetic sensor assembly 2 will now be described with particular reference to FIGS. 3 and 4.

Figure 3:
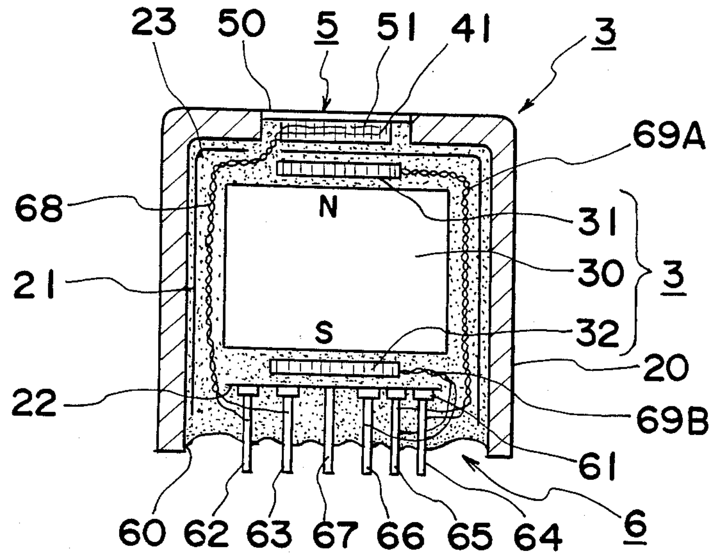
FIG. 3 is a longitudinal sectional view showing the details of the combined optical and magnetic sensor assembly according to the present invention.
Figure 4:
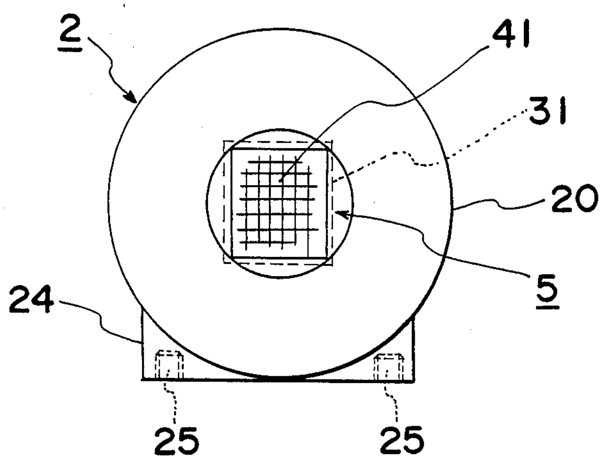
FIG. 4 is a top plan view of the sensor assembly shown in FIG. 3.

Referring now to FIGS. 3 and 4, the casing 20 is of a generally cylindrical configuration having one end opened at 60 and the other end having an aperture 50 defined therein. Within the casing 20, the magnetic sensor 3 comprising the permanent magnet 30 and the detecting and compensating reluctance elements 31 and 32 is accommodated and enclosed by electrostatic shield plates 21 and 22 each made of, for example, brass. The photo sensing element 41 forming the part of the optical sensor 4 is positioned in alignment with the aperture 50 and on one side of the shield plate 21 opposite to the detecting reluctance element 31. The aperture 50 in the casing 20 is covered by a plate glass 51 to protect the light sensing element 41 and also to define a detecting window 5. A plurality of terminal pins 62 to 66 are rigidly secured through insulating members, generally identified by 61, to the shield plate 22 positioned on the side of the compensating reluctance element 32 opposite to the magnet 30 and generally closing the opening 60 of the casing 20. The terminal pins 62 and 63 are electrically connected to the photo sensing element 41 by means of lead wires 68, and the terminal pins 64, 65 and 66 are electrically connected to the detecting and compensating reluctance elements 31 and 32 by means of lead wires 69A and 69B, respectively. A terminal pin 67 for the connection to the ground is positioned between the terminal pins 63 and 66 and is rigidly secured directly to the shield plate 22.

With these elements within the casing 20, the latter is filled with an insulating resin 23 which is in a fluid phase at the time it is poured into the casing 20, which resin 23 upon solidification serves to fix the various internal component parts in position within the casing 20. The casing 20 has, as best shown in FIG. 4, a mounting area 24 having mounting holes 25 defined therein, through which mounting area 24 the combined optical and magnetic sensor assembly 2 can be supported.

The magnetic sensor 3 of the construction described above is adapted to detect a magnetic field developed by a magnet (not shown) and permeating through the paper money 1 and then to generate an output signal corresponding to the density or concentration of magnetizeable components carried by the paper money 1. With respect to the optical sensor, although it has been shown as a transmissive type, it may be of a reflective type. However, where the reflective type is used, two optical sensors of reflective type are required to read front and back patterns on the paper money 1, that is, patterns on respective surfaces of the paper money 1, and what is formed by combining the front and back patterns together is to be used as an optical pattern. This is for the purpose of making it correspond to a magnetic pattern because the magnetic pattern on each surface of the paper money 1 is read out by the single magnetic sensor. In addition, although the magnetic and optical patterns have been described as detected at one and the same check point, as shown in FIG. 1, two check points for the detection of the magnetic and optical patterns, respectively, may be employed provided that they are spaced in a direction parallel to the direction of movement of the paper money 1. In this case, either a delay line or a rotary encoder capable of generating a pulse synchronized with the movement of the paper money (for example, capable of generating a pulse each time the paper money 1 is moved a distance of 1 mm) should be employed for delaying a predetermined time the output from one of the magnetic and optical sensors which is located on the trailing side of the other of the magnetic and optical sensors with respect to the direction of movement of the paper money 1, which predetermined time corresponds to the space between the magnetic and optical sensors, so that an effect similar to that given when the single check point in employed such as in the illustrated embodiment can be obtained.

Figure 5:
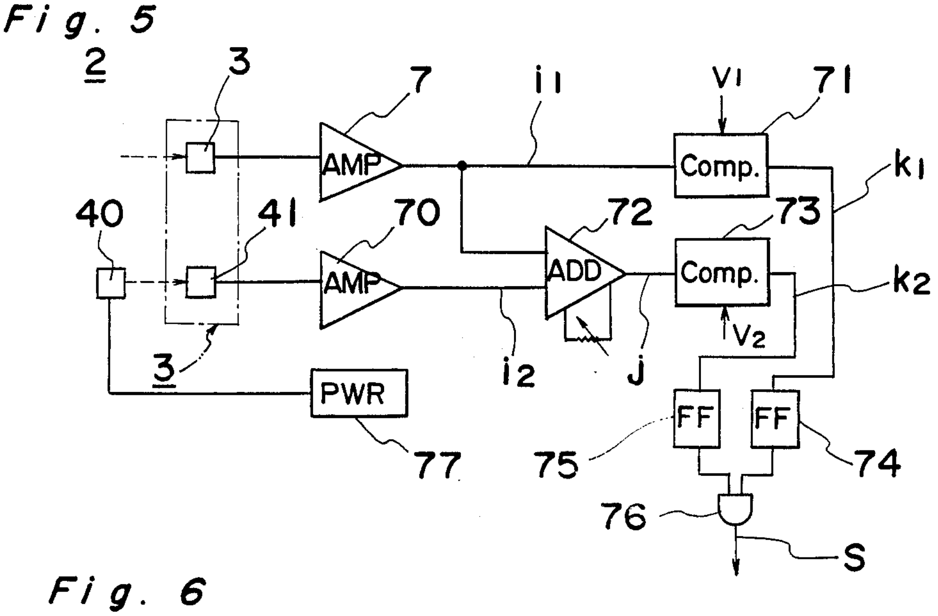
FIG. 5 is a circuit block diagram showing a verifying device utilizing the combined optical and magnetic sensor assembly according to the present invention.

In FIG. 5, a verifying device employing the combined optical and magnetic sensor assembly 2 of the construction described hereinabove is shown. Referring to FIG. 5, the device comprises first and second amplifiers 7 and 70 connected respectively to the magnetic sensor 3 and the photo sensing element 41, a first comparator 71 connected with the first amplifier 7, an adder 72 having input terminals connected respectively with the first and second amplifiers 7 and 70, a second comparator 73 connected with the adder 72, an AND gate 76 having input terminals connected respectively with the comparators 71 and 73 through flip-flop circuits 74 and 75, and a source of electric power 77 from which the electric power necessary to energize the light source 40 is supplied.

Figure 6:
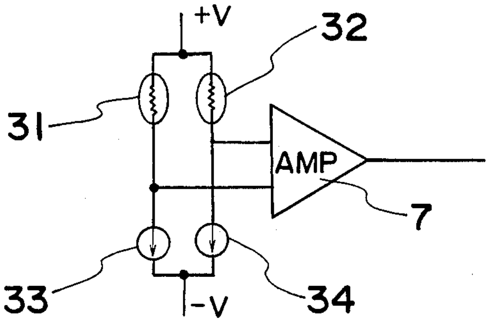
FIG. 6 is a circuit diagram showing an electric wiring system of the sensor, assembly.
Figure 7A:
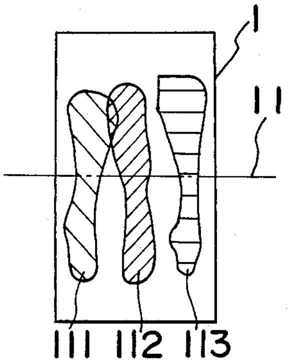
FIGS. 7 *a*–7*c*, 8*a*–8*d*, 9*a*–9*d*, 10*b*–10*d* to 11*b*–11*d* are diagrams showing wave forms of electric signals appearing in the circuit of FIG. 5, which diagrams are used to explain the operation of the verifying device in relation to different types of papers presented for verification.
Figure 8A:
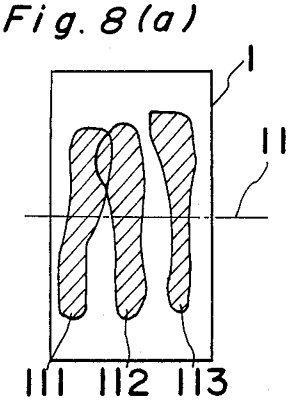
Figure 9A:
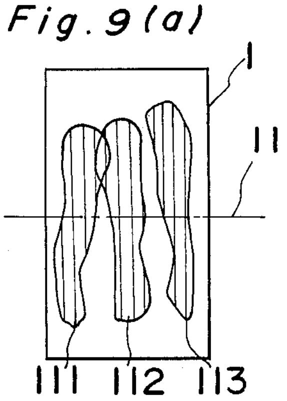
Figure 7B:
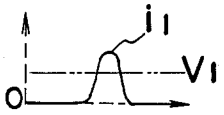
Figure 8B:
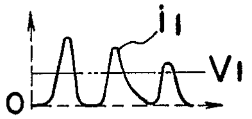
Figure 9B:
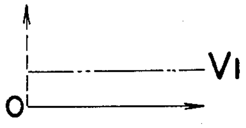
Figure 7C:
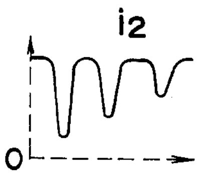
Figure 8C:
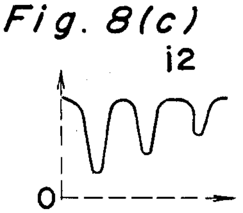
Figure 9C:
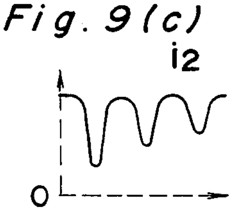
Figure 7D:
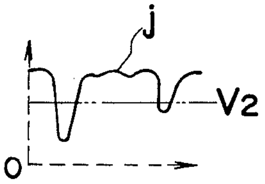
Figure 8D:
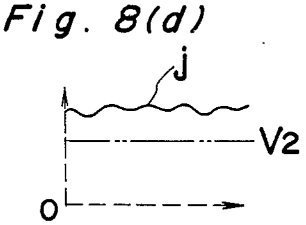
Figure 9D:
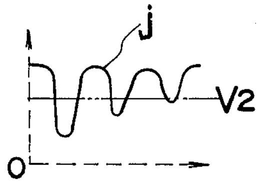

The magnetic sensor 3 reads the magnetic pattern on the paper money 1 and generates an output signal indicative of the magnetic pattern read out from the paper money 1. This output signal from the magnetic sensor 3 is amplified by the amplifier 7 to give an amplified output signal i1 indicative of the magnetic pattern on the paper money 1. On the other hand, the photo sensing element 41 after having received the light which has been passed from the light source 40 thereto through the paper money 1 generates an output signal indicative of the optical pattern corresponding to the intensity of light received thereby, which output signal is subsequently amplified by the amplifier 70 to give an amplified output signal i2 indicative of the optical pattern read out from the paper money 1. Specifically, the magnetic sensor 3 is so constructed, for example, as shown in FIG. 6, that the detecting and compensating reluctance elements 31 and 32 are respectively connected to sources of constant current 33 and 34, and the output signal from the magnetic sensor 3 is represented by the difference in potential between the reluctance elements 31 and 32.

The amplified output signal i1 from the amplifier 7 is fed to the comparator 71 at which it is compared with a predetermined threshold voltage V1. This comparator 71 generates a high level signal k1 only when the amplified output sinal i1 exceeds the threshold voltage V1. This amplified output signal i1 is also supplied to the adder 72 together with the amplified output signal i2 from the amplifier 70, wherefore the adder 72 generates an added output signal j which is in turn fed to the second comparator 73. The comparator 73 serves to compare the added output signal j with a predetermined threshold voltage V2 and generates a high level signal k2 only when the added output signal j falls below the threshold voltage V2.

The adder 72 serves to combine the amplified output signals i1 and i2 together to give the added output j after the respective gains of the amplified output signals i1 and i2 have been adjusted. This gain adjustment is carried out in such a manner that, when the sensor assembly which has been aligned with a thin colored, low magnetized area of the paper money is subsequently aligned with a thick colored, high magnetized area thereof at the check point, variation in amplified output signal i1 from the amplifier 7 can be counter-balanced by variation in amplified output signal i2 from the amplifier 70, that is, the output from the adder 72 does not deviate from a predetermined output level which is obtained when the thin colored, low magnetized area of the paper money 1 is aligned with the check point.

The above described gain adjustment can also be carried out by adjusting the respective gains of the amplifiers 7 and 70 instead of or simultaneously with adjusting the gain of the adder 72. In addition, although in the illustrated embodiment since the variation of the amplified output signal i1 is opposite in polarity (or direction) to that of the amplified output signal i2, the adder is utilized to combine the magnetic and optical patterns together, a differential amplifier may be employed for this purpose if the both are the same in polarity, i.e., the amplified output signal i1 tends to vary in the same direction as the amplified output signal i2 does.

Referring still to FIG. 5, the high level signals k1 and k2 respectively from the comparators 71 and 73 are fed to and stored in the respective flip-flop circuits 74 and 75 which are adapted to be reset at any suitable timing, for example, subsequent to the pattern read-out, or prior to the pattern read-out to be performed subject to the next succeeding paper money. Output pulses from the respective flip-flop circuits 74 and 75 are then fed to the AND gate 76 from which a high level signal is generated, when both of the output pulses applied from the respective flip-flop circuits 74 and 75 to the gate 76 are in a high level state, this high level signal from the gate 76 indicating that the paper money 1 so verified is a genuine one. Unless both of the output pulses from the respective flip-flop circuits 74 and 75 are in a high level state, the gate 76 generates a low level signal indicating that the paper money 1 so verified is countefeit.

The operation of the circuit shown in FIG. 5 under different conditions will now be described with particular reference to FIGS. 7 to 9. It is to be noted that, for the purpose of the description of the present invention, the following three types of paper monies shown respectively in FIGS. 7(*a*), 8(*a*) and 9(*a*) are assumed to be presented for the verification as to whether they are genuine or counterfeit.

The paper money shown in FIG. 7(*a*) is assumed to be a genuine one and, while printed in a multiple of colors, has three invisible code areas 111, 112 and 113 which are printed by the use of respective magnetic color inks having different magnetic properties. Of these invisible code areas, the area 112 is a thick colored, high magnetized area containing the magnetized ink of a density sufficient to cause the amplified output signal i1 to exceed the threshold voltage V1 whereas each of the areas 111 and 113 is a thick colored, low magnetized area containing the magnetic ink of a density insufficient to cause the amplified output signal i1 to exceed the threshold voltage V1. (Alternatively, each of the areas 111 and 113 may be printed by the use of a non-magnetic color ink).

When the paper money shown in FIG. 7(*a*) is moved through the check point where the combined optical and magnetic sensor assembly 2 is located, which the sensor assembly 2 relatively scans the paper money along the track 11, the amplified output signal i1 from the amplifier 7 represents such a waveform as shown in FIG. 7(*b*) and has its peak value exceeding the threshold voltage V1 as a result of the presence of the high magnetized area 112. On the other hand, the amplified output signal i2 from the amplifier 70 connected with the photo sensing element 41 represents such a waveform as shown in FIG. 7(*c*) with its level alternately increasing and decreasing in response to the detection of light and dark areas, that is, thick colored and thin colored areas, on the paper money, respectively. Accordingly, when the amplified output signals i1 and i2 are combined together by the adder 72, the added output signal j from the adder 72 represents such a waveform as shown in FIG. 7(*d*) and it will readily be seen that the positive going portion of the waveform of the amplified output signal i1, which has resulted from the detection of the thick colored, high magnetized area 112, is counterbalanced with a negative going portion of the waveform of the amplified output signal i2 which has also resulted from the detection of the thick colored, high magnetized area 112.

Where the paper money is forged in such a way as to render all of the code areas 111, 112 and 113 to be constituted by a thick colored, high magnetized area as shown in FIG. 8(*a*) such as occurring when a person, without knowing that in the genuine paper money only the code area 112 is the thick colored, high magnetized area, makes a copy of the genuine paper money using only magnetic color inks, the amplified output signals i1 and i2 show such respective waveforms as shown in FIGS. 7(*b*) and 7(*c*). The waveform shown in FIG. 8(*c*) is in relationship generally reversal to the waveform shown in FIG. 8(*b*). Accordingly, with these amplified output signals i1 and i2 supplied, the adder 72 generates the added output signal j of such a waveform as shown in FIG. 8(*d*) which has a level constantly exceeding the threshold voltage V2 though slightly varying.

Where the paper money is counterfeit similarly in such a way as to render all of the code areas 111, 112 and 113 to be constituted by a colored area formed by the use of non-magnetic color inks as shown in FIG. 9(*a*), the magnetic sensor 3 fails to generate any output signal such as shown in FIG. 9(*b*) whereas the amplified output signal i2 shows such a waveform as shown in FIG. 9(*c*). Accordingly, the adder 71 generates the added output signal of such a waveform as shown in FIG. 9(*d*) which is substantially identical with the waveform of the amplified output signal i2.

In the case with the paper money, i.e., the counterfeit paper money, shown in FIG. 9(*a*), since the amplified output signal i1 does not exceed the threshold voltage V1 as shown in FIG. 9(*b*), the flip-flop circuit 74 will not be set. Even in the case with the paper money, i.e., the forged paper money, shown in FIG. 8(*a*), since the added output signal j does not fall below the threshold voltage V2 as shown in FIG. 8(*d*), the flip-flop circuit 75 will not be set. However, only in the case with the paper money, i.e., the genuine paper money, shown in FIG. 7(*a*), both of the flip-flop circuits 74 and 75 can be set and, therefore, the high level signal can emerge from the AND gate indicating that paper money presented for the verification is the genuine.

Figure 10B:
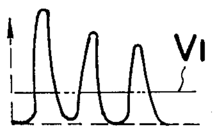
Figure 11B:
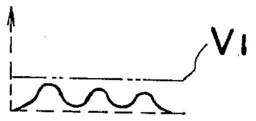
Figure 10D:
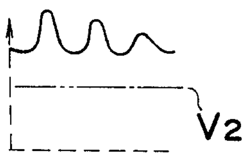
Figure 11D:
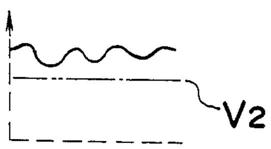

In the event that the code areas 111, 112 and 113 in the paper money shown in FIG. 8(*a*) have an extremely high magnetic concentration, the added output signal from the adder 72 exceeds the threshold voltage V2 as shown in FIG. 10(*d*) and, accordingly, the flip-flop circuit 75 will not be set. Conversely, in the event that the code areas 111, 112 and 113 in the paper money shown in FIG. 8(*a*) have an extremely low magnetic concentration, the possibility of the flip-flop circuits 74 and 75 being simultaneously set can be avoided by suitably selecting the threshold voltages V1 and V2 in such a manner that the amplified output signal from the amplifier 7 can remain below the threshold voltage V1 such as to avoid the setting of the flip-flop circuit 74 and that, as shown in FIG. 11(*d*), the added output signal from the adder 72 can remain exceeding the threshold voltage V2 such as to avoid the setting of the flip-flop circuit 75, respectively.

Referring back to FIG. 5, instead of the employment of the flip-flop circuits 74 and 75 and the AND gate 76, the verifying device may make use of a control means, including a program memory (ROM) for storing a program, a microprocessor (CPU) operable according to the program stored in the program memory and a data memory (RAM) for storing data, for checking the respective output signals from the comparators 71 and 73 in such a way that, when the levels of the respective output signals from the comparators 71 and 73 are higher, corresponding flags (arranged in RAM) can be set, the setting of both of the flags, when it takes place at the time of completion of the read-out, indicating that the paper money presented for the verification was genuine.

In addition, the necessity of the use of the comparators 71 and 73 can be eliminated if means is provided for sampling the output signals respectively from the amplifier 7 and the adder 72 and then effecting an analog-to-digital conversion to them before they are supplied to the control means.

The verifying device according to the present invention so far described and illustrated can serve the purpose by itself. However, it may be combined together with the conventional verifying system based on the bit pattern of "1" and "0" and, in such case, the precise verification can be performed. In addition, where the verifying device of the present invention is used in combination with the conventional system, the conventional system may fill the role of discriminating the denomination of the paper money presented for the verification. In the event that the verifying device of the present invention is used alone without being combined with the conventional system, the denomination of the paper money presented for the verification can also be achieved by detecting the length of the paper money in view of the fact that, in some countries, paper monies of different denomination vary in size.

Where the verifying device of the present invention is used to verify checks, bills or the like which have a clear band to be printed by the use of a magnetic ink, the verification as to whether they are genuine or counterfeit can be achieved by detecting the fact that blocks for the entry of the amount of money and the name and address of the drawer, which have no magnetism, are filled with black characters (thick colored characters) and, also, the presence of the clear band containing magnetic ink and printed in thick color.

As hereinbefore described, since the present invention is such that the magnetic and photo sensors are positioned on the same scan line for reading the magnetic and optical patterns, respectively, present on the same scan line, and the magnetic and optical patterns are superimposed one above the other at the check point so that any change in level thereof can be discriminated by a first discriminating means, i.e., the first comparator, the verification as to whether the colored, such as shown in FIG. 7, printed by the use of one or more magnetic color inks is genuine or counterfeit can be performed accurately.

In addition, where the verifying device of the present invention is provided with a second discriminating means, i.e., the second comparator, for detecting change in level of the magnetic pattern so that the verification can be done on the basis of the respective results of discrimination performed by the first and second discriminating means, the colored material printed by the use of one or more non-magnetic inks such as shown in FIG. 9 can also be verified as to whether it is genuine or counterfeit.

Furthermore, since the magnetic and photo sensors are combined together in a single casing according to the present invention, not only can the space of installation thereof be advantageously minimized, but also any time adjustment which would be required where the magnetic and photo sensors are positioned in spaced relation can be advantageously eliminated. In addition, since the photo sensor is positioned above the magnetic sensor within the common casing, the magnetic sensor can be advantageously protected from any external influence such as change in ambient temperature and/or an external force.

Although the present invention has fully been described in connection with the preferred embodiment thereof with reference to the accompanying drawings, it is to be noted that various changes and modifications are apparent to those skilled in the art. Such changes and modifications are to be understood as included within the scope of the present invention unless they depart therefrom.

What is claimed is:

1. A system for the verification of a magnetic printed material as to whether it is genuine or counterfeit, comprising magnetic and photo sensors arranged on the same scan line relative to the magnetically printed material for reading magnetic and optical patterns on the same scan line;

a first discriminating means for, after the magnetic and optical patterns are superimposed one above the other at the same check point, discriminating the change in level thereof; and a second discriminating means for discriminating change in the level of the magnetic pattern, wherein the verification is performed on the basis of the results of the discrimination performed by the first and second discriminating means.

2. A combined magnetic and optical sensor assembly which comprising a casing having a detecting window and a connection terminal support, a magnetic sensor accommodated within the casing, and a photo sensor accommodated within the casing and positioned between the magnetic sensor and the detecting window.

* * * * *